(12) United States Patent
Brochu et al.

(10) Patent No.: US 7,609,536 B2
(45) Date of Patent: Oct. 27, 2009

(54) AUTOTRANSFORMER AC/DC CONVERTER

(75) Inventors: Eric Brochu, Sarrigne (FR); Daniel Dauzon, Angers (FR); Joël Leboisselier, Segre (FR)

(73) Assignee: Artus, Avrille (FR)

( * ) Notice: Subject to any disclaimer, the term of this patent is extended or adjusted under 35 U.S.C. 154(b) by 274 days.

(21) Appl. No.: 11/704,793

(22) Filed: Feb. 9, 2007

(65) Prior Publication Data

US 2007/0258275 A1    Nov. 8, 2007

(30) Foreign Application Priority Data

Feb. 10, 2006    (FR)    ................................. 06 50476

(51) Int. Cl.
*H02M 7/08* (2006.01)
*G05F 1/14* (2006.01)
(52) U.S. Cl. ........................................ 363/69; 323/255
(58) Field of Classification Search ................. 323/255, 323/256, 247; 363/69
See application file for complete search history.

(56) References Cited

U.S. PATENT DOCUMENTS

| | | | | |
|---|---|---|---|---|
| 4,774,649 A | * | 9/1988 | Archer | .......................... 363/20 |
| 5,933,338 A | | 8/1999 | Wallace | ........................ 363/61 |
| 6,118,362 A | | 9/2000 | Tinkler et al. | ............... 336/170 |

FOREIGN PATENT DOCUMENTS

| | | |
|---|---|---|
| EP | 1555745 | 7/2005 |
| FR | 1139199 | 6/1957 |

OTHER PUBLICATIONS

Sewan Choi, et al.; "Polyphase Transformer Arrangements with Reduced kVA Capacities for Harmonic Current Reductin in Rectifier Type Utility Interface", Power Electronics Specialists Conference, 1995. vol. 1, (pp. 353-359), Jun. 18, 1995.

* cited by examiner

*Primary Examiner*—Shawn Riley
(74) *Attorney, Agent, or Firm*—BainwoodHuang

(57) ABSTRACT

In an AC/DC converter including an autotransformer having a primary winding connected to an AC power supply network and two secondary windings connected to two rectifier circuits operating in parallel to deliver a DC voltage to a load, the two same-polarity outputs of the two rectifier circuits being connected to respective first ends of a first coil and of a second coil whose second ends are connected together to form a first output of the converter, and the two outputs of the two rectifier circuits having the same other polarity being connected respectively to the first ends of a third coil and of a fourth coil whose second ends are connected together to form a second output of the converter, provision is made for the first, second, third, and fourth coils are wound on a common magnetic core. The invention is applicable to converters for use on board aircraft.

1 Claim, 3 Drawing Sheets

AUTOTRANSFORMER AC/DC CONVERTER

FIELD OF THE INVENTION

The present invention relates to the field of alternating current to direct current (AC/DC) converters and it relates more particularly to an AC/DC converter including an autotransformer.

PRIOR ART

The use of AC/DC converters is well known in all types of industry. In aviation applications, in order to limit harmonics and reduce the weight and the volume of on-board equipment, the transformers usually to be found in such converters are advantageously replaced by autotransformers.

FIG. 4 shows an AC/DC converter 10 as disclosed in particular in U.S. Pat. No. 6,118,362, the converter delivering DC to a load 12, e.g. an inverter, and drawing power from an AC power supply network 14. The converter includes an autotransformer 16 having two secondaries connected to two rectifier bridges 18, 20 whose two outputs are in turn combined by two so-called "interphase" coils 22, 24. The two midpoints of these two coils constitute the output of the converter 10, with a filter being connected thereto, e.g. comprising a smoothing choke 26 in series and a storage capacitor 28 in parallel with the load 12. When the load is an inverter, the smoothing choke serves to smooth the demand for current from the capacitor on switching on, and to increase the harmonic rejection of the inverter.

Overall, that type of converter gives satisfaction. Nevertheless, since the autotransformer creates an objectionable voltage between the two rectifier bridges, the voltage must be blocked by two interphase inductors that are therefore dimensioned accordingly, both in terms of voltage and in terms of current. The dimensions required are problematic for on-board applications.

OBJECT AND DEFINITION OF THE INVENTION

The present invention thus proposes an autotransformer AC/DC converter that is particularly compact.

This object is achieved by an AC/DC converter including an autotransformer having a primary winding connected to an AC power supply network and two secondary windings connected to two rectifier circuits operating in parallel to deliver a DC voltage to a load, the two same-polarity outputs of the two rectifier circuits being connected to respective first ends of a first coil and of a second coil whose second ends are connected together to form a first output of the converter, and the two outputs of the two rectifier circuits having the same other polarity being connected respectively to the first ends of a third coil and of a fourth coil whose second ends are connected together to form a second output of the converter, wherein said first, second, third, and fourth coils are wound on a common magnetic core.

Thus, by replacing the two interphase inductors by a single inductor, considerable savings are obtained in the weight and the volume of the converter, thus making it easier to use on board an aircraft.

BRIEF DESCRIPTION OF THE DRAWINGS

The characteristics and advantages of the present invention appear more clearly from the following description made by way of non-limiting indication and with reference to the accompanying drawings, in which.

DETAILED DESCRIPTION OF A PREFERRED EMBODIMENT

Figure 1:
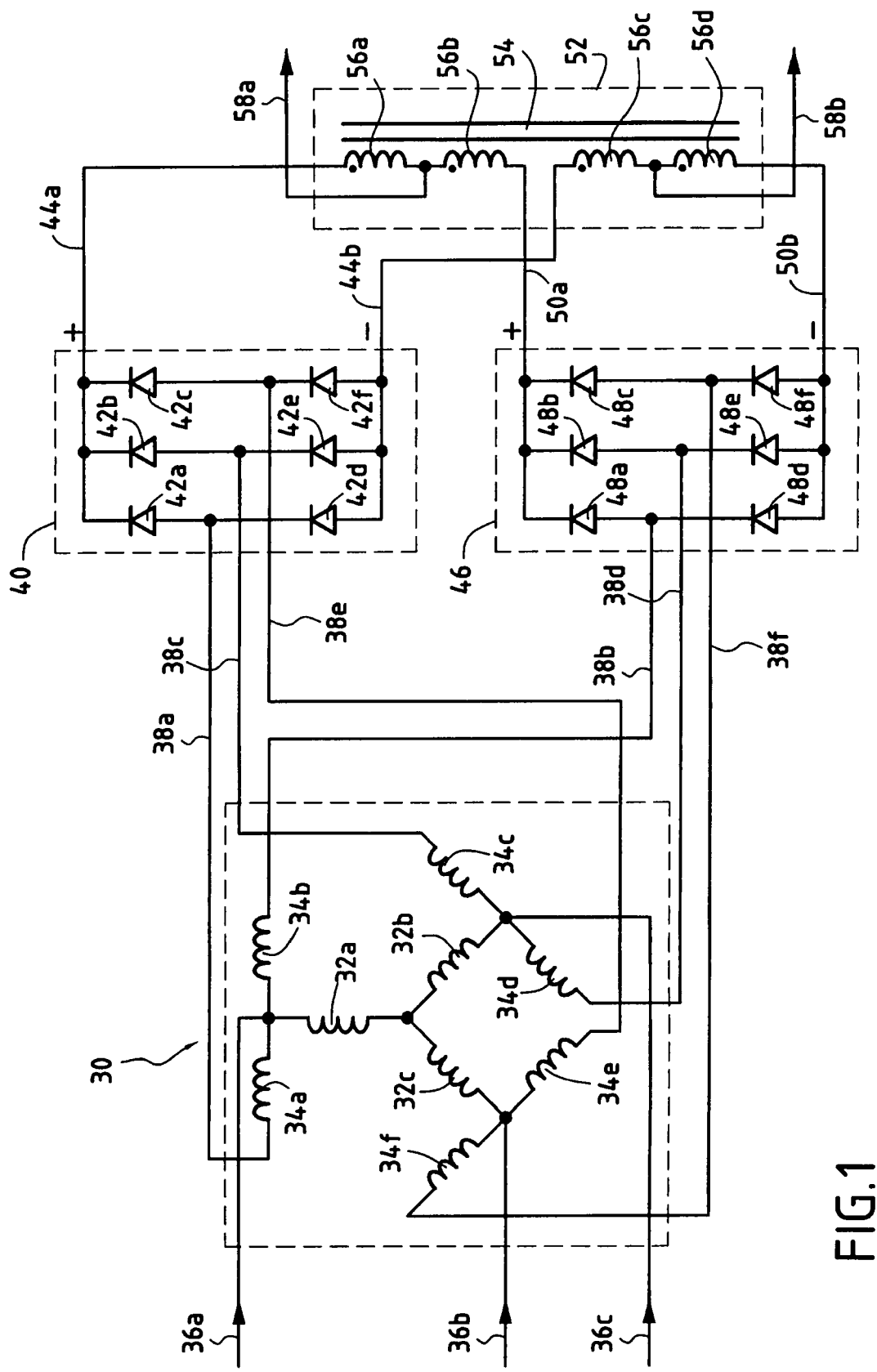
FIG. 1 shows an embodiment of an autotransformer AC/DC converter in accordance with the present invention.

FIG. 1 shows an example of an autotransformer AC/DC converter of the invention.

In conventional manner, the converter comprises an autotransformer 30 having first, second, and third primary windings 32a, 32b, and 32c interconnected to form a star primary winding, and first, second, third, fourth, fifth, and sixth secondary windings 34a, 34b, 34c, 34d, 34e, and 34f associated in threes to form two secondary windings in a star configuration. Naturally, these star configurations for the primary and secondary windings are not essential for the present invention and, for example, it is possible to have a configuration in which the primary and secondary windings are in a delta configuration, or indeed it is also possible to envisage a combined star and delta configuration.

The autotransformer serves to convert the three-phase AC power supply delivered on input conductors 36a to 36c by an electrical supply power network, e.g. a variable frequency 115 V/400 Hz three-phase power supply network, into a six-phase AC power supply in which the six phases are delivered on output conductors 38a to 38f. This enables two sub-networks to be created that are at a mutual phase offset of 30.degree., i.e. +15.degree. and −15.degree. relative to the power supply network.

The three phases available on the conductors 38a, 38c, 38e are then rectified by a first rectifier bridge 40 having six diodes 42a to 42f that deliver a first DC voltage between two outputs 44a, 44b, and the other three phases available on the conductors 38b, 38d, 38f are rectified in parallel by a second rectifier bridge 46 having six diodes 48a to 48f that deliver a second DC voltage between two outputs 50a, 50b. The first and second voltages are identical but with residual ripple at a phase offset of 30°.

According to the invention, the four outputs 44a & 44b and 50a & 50b of the two rectifier circuits 40 and 46 are connected to four input terminals of a single inductor 52. This inductor is referred to below as the "intercircuit" inductor and comprises a common magnetic core 54 on which four coils 56a to 56d are wound. More precisely, the first coil 56a has a first end connected to the first polarity output 44a of the first rectifier bridge 40 and a second end connected to the first end of the second coil 46b whose own second end is connected to the same-polarity output 50a from the second rectifier bridge 46. Similarly, the third coil 56c has a first end connected to the second polarity output 44b of the first rectifier bridge 40 and a second end connected to a first end of the fourth coil 56d whose own second end is connected to the same-polarity output 50b of the second rectifier bridge 46. The first junction point between the first and second coils and the second junction point between the third and fourth coils constitute the two output terminals 58a and 58b of the converter 10 to which the load can then be connected, conventionally via a filter stage.

Figure 2:
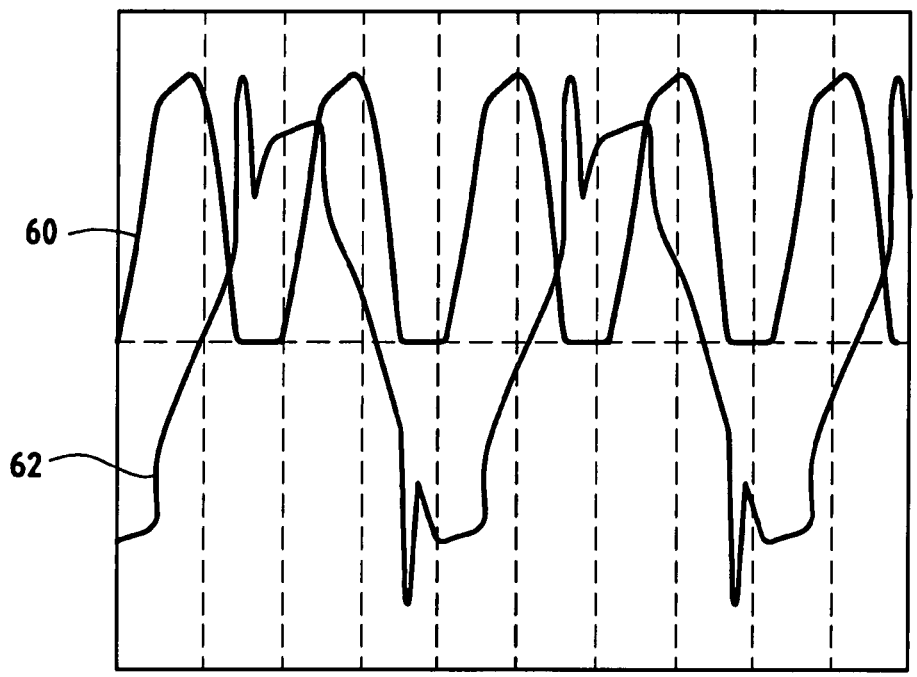
FIG. 2 shows some of the signals available from the FIG. 1 converter.
Figure 4:
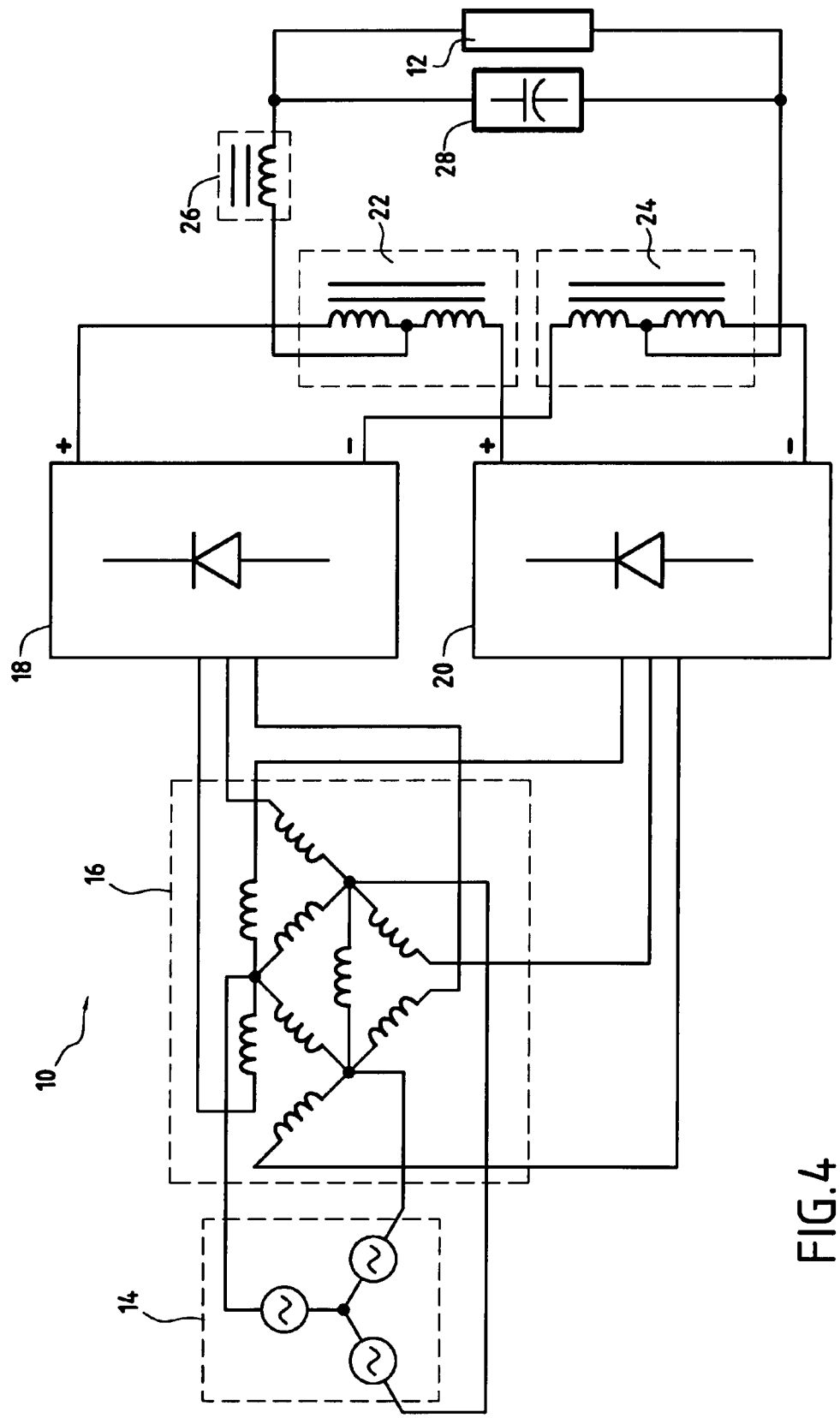
FIG. 4 shows a prior art AC/DC converter.

FIG. 2 shows some of the voltages obtained at the terminals of the interphase inductor of a converter powered by a 115 V/400 Hz AC voltage. It should be observed that the frequency of the signal 60 is three times the frequency of the input signal 62, and because of the presence on the output line of two coils in series, the peak-to-peak voltage is about half that of the maximum input voltage.

Figure 3:
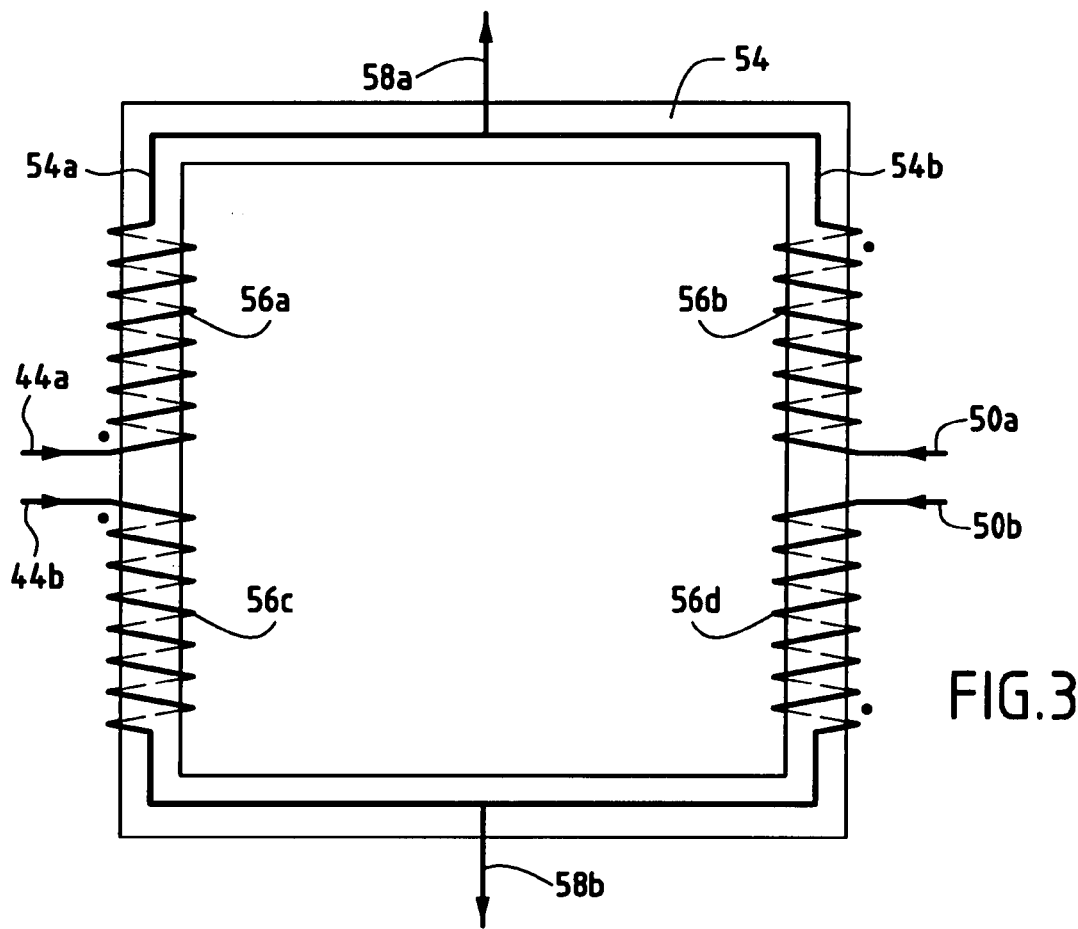
FIG. 3 shows an embodiment of an intercircuit coil of the FIG. 1 converter.

FIG. 3 shows an embodiment of the intercircuit inductor. The magnetic core 54 of this inductor, which is advantageously in the form of a stack or juxtaposition of sheets or laminations of magnetic material having high relative permeability (e.g. a silicon texture steel or an amorphous alloy), can be made as a single part (i.e. without any airgap) or can be made up of two parts, one being [-shaped and the other being]-shaped, the two parts being for uniting in such a manner as to minimize the airgap.

In a preferred embodiment, the four coils 56a to 56d are wound around two columns 54a, 54b of the common magnetic core and are preferably embedded in a damping resin. More precisely, the first and third coils 56a and 56c are wound on one column 54a, while the second and fourth coils 56b and 56d are wound on the opposite column 54b.

The intercircuit inductor is dimensioned in order to minimize its weight. This can be done using conventional transformer calculation formulae. Thus, the first step is to select a magnetic circuit with a high induction field, and then the maximum number of turns that can be used without saturating the circuit is calculated, after which the section required for the wire is calculated (Sc=number of turns×4 windings×area of a wire), and finally the utilization factor is calculated (Ku=Sc/window area), and it is then verified that the values obtained in this way are acceptable.

It can thus readily be seen that by having recourse to a single intercircuit inductor instead of to the usual two interphase conductors, the corresponding weight is divided by two and the overall size of the converter is reduced accordingly.

Naturally, the present invention can also be applied to configurations in which the number of phases and the phase offsets are different from the six phases and the 30° phase offset described above.

What is claimed is:

1. An AC/DC converter including an autotransformer having a primary winding connected to an AC power supply network and two secondary windings connected to two rectifier circuits operating in parallel to deliver a DC voltage to a load, the two same-polarity outputs of the two rectifier circuits being connected to respective first ends of a first coil and of a second coil whose second ends are connected together to form a first output of the converter, and the two outputs of the two rectifier circuits having the same other polarity being connected respectively to the first ends of a third coil and of a fourth coil whose second ends are connected together to form a second output of the converter, wherein said first, second, third, and fourth coils are wound on a common magnetic core.

* * * * *